March 10, 1970     T. G. FERRIS ET AL     3,499,833
ELECTROPHORESIS DEVICE
Filed Oct. 12, 1964     3 Sheets-Sheet 1
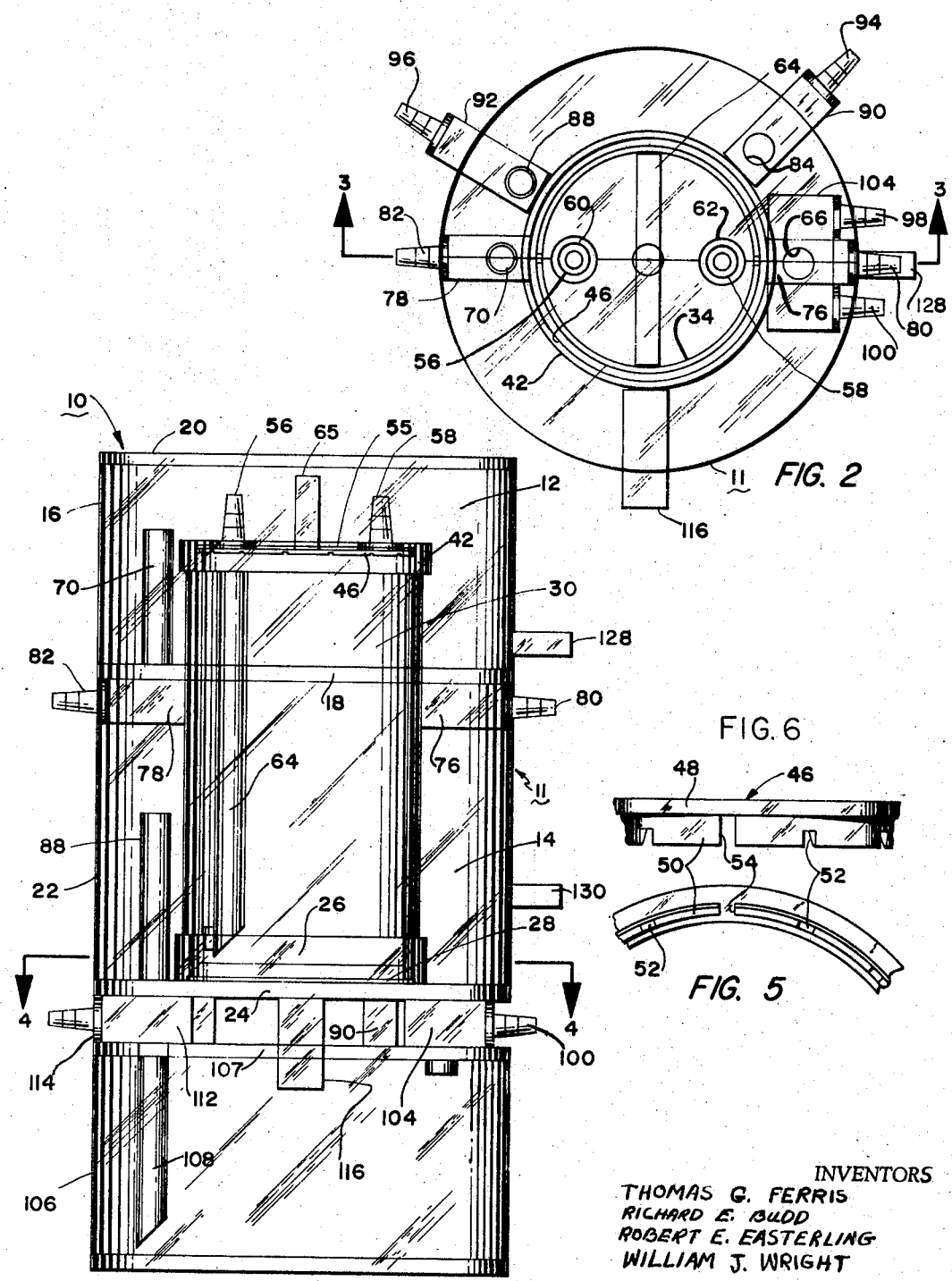
INVENTORS
THOMAS G. FERRIS
RICHARD E. BUDD
ROBERT E. EASTERLING
WILLIAM J. WRIGHT
BY LeBlanc & Shur
ATTORNEYS

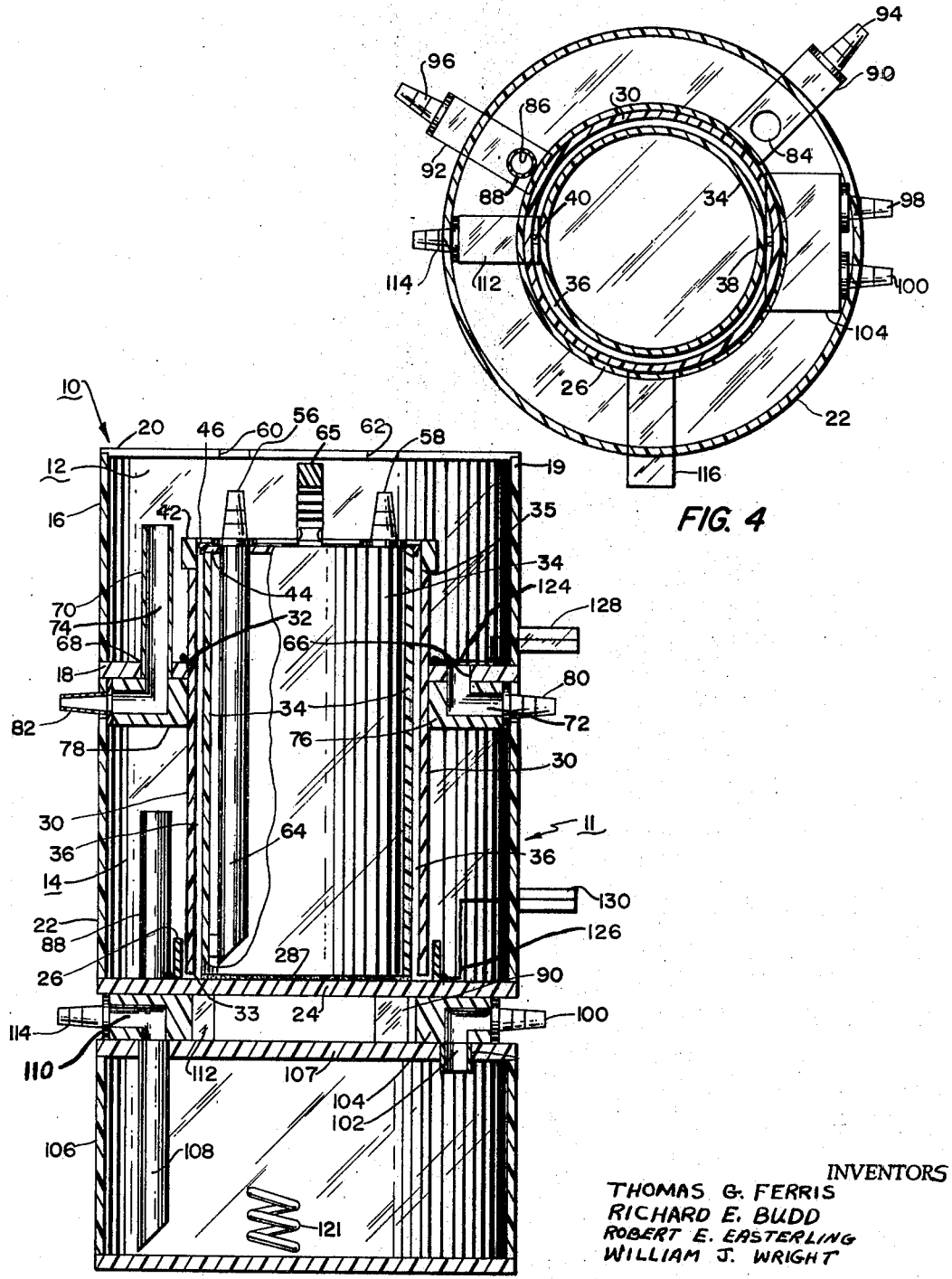

INVENTORS
THOMAS G. FERRIS
RICHARD E. BUDD
ROBERT E. EASTERLING
WILLIAM J. WRIGHT
BY
*LeBlanc & Shur*
ATTORNEYS United States Patent Office 3,499,833
Patented Mar. 10, 1970

3,499,833
ELECTROPHORESIS DEVICE
Thomas George Ferris, Bethesda, and Richard Edgar Budd, Robert Eugene Easterling, and William Joseph Wright, Rockville, Md.; said Thomas G. Ferris assignor to Laura B. Ferris, Washington, D.C.
Filed Oct. 12, 1964, Ser. No. 403,012
Int. Cl. B01k 5/00
U.S. Cl. 204—299
22 Claims

ABSTRACT OF THE DISCLOSURE

The electrophoresis device includes apparatus for simultaneously electrophoretically separating samples on an elongated annular gel slab which samples may be the same or of different compositions. The apparatus includes a means for cooling the gel during electrophoresis by refrigerating the buffer solution used as an electrolyte. Means for recirculating the buffer solution contained in the anode and cathode compartments so as to intermix the buffer solution contained in the electrode compartments are provided to prevent changes in pH and ionic strength due to electrolysis without producing a short circuit.

---

This invention relates to a new, improved apparatus for electrophoretically separating the ionic components of a mixture, and more particularly, a new, improved apparatus for acrylamide gel electrophoreses of the hemoglobins or the serum proteins contained in human blood.

The process of separating the ionic components in a mixture by electrophoresis is based on the fact that ions of different substances migrate at different rates through a medium, such as starch-block, starch-gel or acrylamide gel which is subjected to an electric field. A remarkable degree of resolution or separation has been achieved through the use of electrophoresis particularly when advantage is taken of the frictional properties of gels to aid the separation by sieving at the molecular level.

In the mid 1950's, the so-called disc method of electrophoresis was developed and made possible an unusually high degree of resolution or separation. Apparatus was developed to practice the method and is presently commercially available. Such apparatus consists of spaced upper and lower baths of electrolytic or buffer solutions with a plurality of small diameter glass or rigid plastic tubes extending therebetween. The upper and lower ends of these tubes are submerged in the upper and lower baths respectively, and each tube is filled with a gelatinous medium such as acrylamide gel. A sample of the mixture to be separated is introduced into the upper ends of the tubes, a voltage potential is imposed between the ends of the tubes and electrophoretic separation proceeds. Thereafter, the columns of gel are carefully removed from the tubes, stained and separately analyzed.

While this above-described disc electrophoresis apparatus provided improved results as compared to the results obtained by the previously-used devices, it still entails certain definite disadvantages. For instance, a great deal of "laboratory technique" and time is required initially to fill the tubes correctly with the gel and sample, and, then, after the separation process has been completed, to remove the columns of gel from the tubes. This latter removal step, by necessity, is time consuming and tedious because the whole test is for naught if the gelatinous column is broken or damaged during its removal from the tube. Also the spacing of the tubes and electrodes is critical in that the electrodes in the upper and lower baths must be spaced an equal distance from all the tubes and the tubes must be equidistant from each other. Moreover, it is extremely difficult to cool the tubes during the separation process.

According to the present invention there is provided a new, improved apparatus which avoids the above-mentioned disadvantages while producing comparable or superior results. The new apparatus is sturdy, relatively inexpensive to manufacture and does not require that the person running the separation process have a great deal of "laboratory technique" in order to obtain satisfactory results.

In the apparatus of this invention, the electrophoresis process is performed in a gelatin filled annular space, formed between two concentrically positioned cylindrical members, instead of in a plurality of small diameter tubes. The top and bottom edges of the annular gelatinous slab in that space communicate with containers filled with electrolyte or buffer solution, and the slab itself is divided into separate vertical sections whereby more than one type of sample can be separated at one time. The apparatus provides a simplified yet effective method of cooling the gel in the annular space during the separation process, and also includes means for circulating the buffer solutions in the containers thereby maintaining the pH and the molarity of the solution relatively constant during the separation process.

In addition, the novel design and arrangement of the apparatus of this invention reduces the cost of electrophoretically separating a sample by as much as 50% because of its high rate of operation. Also, due to the separate vertical sections, two or more different gels can be used in the same separation process, thereby providing the apparatus with a degree of flexibility heretofore unknown.

Accordingly, it is the primary object of this invention to provide a novel, improved, simplified and sturdy apparatus for electrophoretically separating the ionic components of a mixture.

It is a further object of the invention to provide an apparatus in which the electrophoretic separation process is performed in an annular gelatinous slab.

It is a still further object of the invention to provide an electrophoretically separating apparatus which provides results equivalent or superior to those now obtained by using present commercially available apparatus. Moreover, through the use of the apparatus of the invention, such results are obtained at a fraction of the cost and without requiring the operator of the apparatus to possess a great deal of "laboratory technique."

It is another object of the invention to provide an electrophoretically separating apparatus in which two or more different gels can be used during the same separation operation.

It is another object of the present invention to provide a simplified yet effective means of cooling the gel during the entire separation operation.

Yet another object of the present invention is to provide means for circulating the buffer or electrolyte solutions so as to maintain the pH or molarity relatively constant during the separation process.

These and further objects and advantages of the invention will become more apparent upon reference to the following specification, claims and drawings wherein the preferred embodiment is particularly described:

FIGURE 1 is an elevation view of the electrophoretic separation apparatus of the invention.

FIGURE 2 is a plan view of the apparatus shown in FIGURE 1.

FIGURE 3 is a vertical sectional view taken on lines 3—3 in FIGURE 2.

FIGURE 4 is a horizontal sectional view taken on lines 4—4 in FIGURE 1.

FIGURE 5 is a partial bottom view of a sample slab former of this invention.

FIGURE 6 is a partial elevation view of the sample slab former.

Figure 7:
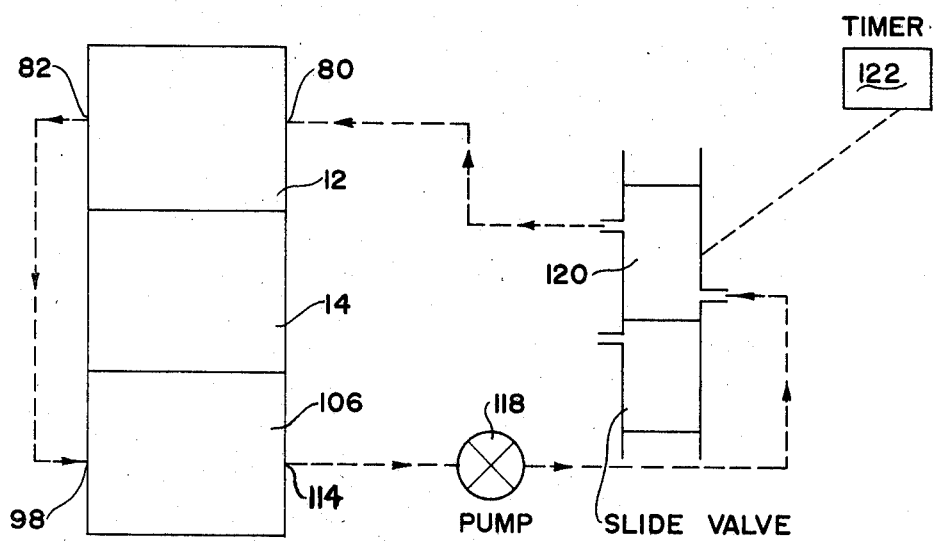
FIGURE 7 is a diagrammatic view of the buffer solution circulation system showing the outlet of the pump connected to the upper solution container.

Referring to the drawings, particularly to FIGURES 1–4, the vertical electrophoresis apparatus 10 is constructed primarily of a clear, strong, chemically inert, electrical insulating plastic material such as acrylic plastic. This permits observation of the separation process during the operation of the apparatus and, of course, allows the operator to exercise a greater degree of control over the entire electrophoretic process.

The apparatus 10 includes a large diameter tubular member 11 which, in fact, is comprised of an upper electrode vessel 12 supported on a lower electrode vessel 14. These vessels contain electrolyte or buffer solutions during the separation process. The upper vessel 12 has a cylindrical wall 16 and annular bottom plate 18, and its open, upper end 19 is normally covered by a lid 20. The lower vessel 14 likewise has a cylindrical wall 22 which is the same diameter as wall 16. As noted above, the upper vessel sits on the top of the lower vessel and, when assembled, the vessels appear to be of a one-piece construction.

A circular plate 24 forms the bottom of the lower vessel and has a concentrically positioned annular baffle or flange 26 mounted thereon and projecting a short distance upwardly therefrom.

An outer cylinder 30 is mounted in the centrally located opening 32 in the plate 18 and extends upwardly and downwardly therefrom so that when the vessels 12 and 14 are assembled (as shown in FIGURES 1 and 3), the lower end 33 of the cylinder 30 fits within the baffle 26 and is spaced slightly from the bottom plate 24. The upper end 35 of the cylinder 30 extends above the plate 18 to a point approximately one-half the distance from the plate 18 to the upper end 19 of the vessel 12.

A second, smaller diameter cylinder 34 fits within the cylinder 30 and rests on disc 28 thereby forming or defining an annular space 36 between the inner wall of the cylinder 30 and the outer wall of the cylinder 34, wherein a gelatinous tube or slab may be formed. This annular space 36 is divided into two independent vertical sections by spacer bars 38 and 40, which extend from the upper to the lower ends of the cylinders. These vertical sections permit more than one type of sample to be run during the process and also permit the use of two different kinds of gel whereby two completely unrelated analyses can be carried out at the same time.

The upper end 35 of the cylinder 30 has a collar 42 which projects slightly above the upper end 44 of the cylinder 34 when the cylinders are in place (as shown in FIGURES 1 and 3). This collar forms a small reservoir or cup at the upper ends of the cylinders to receive any extra gel that cannot be accommodated in the annular space 36.

The upper end 44 of cylinder 34 is adapted to receive an annular sample slot forming member 46. As shown in FIGURES 5 and 6, this member includes a collar portion 48 and downwardly depending flanges 50 having a plurality of grooves 52 formed therein. The flange 50, when the member 46 is mounted on the cylinder, forms fourteen sample slots in the upper end of the gelatinous slab and the grooves 52 serve to form or define the ends of these sample slots. The flange also has two openings 54 therein to receive the upper ends of the spacer bars 38 and 40. An auxiliary function of the member 46 is that it serves to center the cylinder 34 with respect to cylinder 30 and thus making sure that the thickness of the slab is uniform.

As mentioned above, the apparatus of this invention includes a simplified means for cooling the gelatinous slab during the separation process. This means is associated with the cylinder 34 and will now be described.

The cylinder 34 has a hollow interior which is defined by bottom, side and top walls which are closed except for the openings in the top wall 55 through the nipples 56 and 58. These nipples are adapted to receive and hold the ends of tubes or hoses (not shown) which pass through openings 60 and 62 in the lid 19. These tubes or hoses circulate a coolant such as water through the interior of the cylinder and this circulation keeps the gelatinous slab cool throughout the separation process. A pipe 64 extends from the inlet nipple 56 to adjacent the bottom of the cylinder to insure complete circulation within the cylinder.

As noted above, water may be used as the coolant, and it has been found that water from the cold water faucet is sufficient to keep the slab of gel cool. In this case, the outlet nipple 58 is connected directly with a drain. Thus the above-described structure provides a simplified, dependable yet efficient means for cooling the gelatinous slab throughout the electrophoretic process. A handle 65 is attached to the upper wall of the cylinder 34 to facilitate placing the cylinder within cylinder 30 and removing it therefrom.

As mentioned above the electrophoretic apparatus of this invention also includes means for circulating the electrolyte or buffer solutions in the upper and lower vessels. This circulation of the solutions is desirable because it maintains their pH and molarity relatively constant throughout the separation process. However, care must be exercised so that this circulation does not short circuit the system. This circulation system will now be described.

In the space between the outer wall of the cylinder 30 and the wall 16 of upper vessel 12, an inlet opening 66 and outlet opening 68 are formed in the annular bottom plate 18. A standpipe 70 is mounted on bottom plate 18 over opening 68 and extends upwardly so that its upper end is located slightly higher than the upper end 35 of the cylinder 30. Thus, the level of the electrolyte or buffer solution within vessel 12 is always maintained slightly above the upper end of this cylinder.

The inlet and outlet openings 66 and 68 communicate respectively with one end of two L-shaped passageways 72 and 74 respectively formed in blocks 76 and 78 attached to the underside of bottom plate 18. The other ends of the passageways 72 and 74 communicate with external nipples 80 and 82, the ends of which project out beyond the walls 16 and 22 and are adapted to receive and hold the ends of tubing or hoses (not shown).

Likewise in the lower vessel 14, inlet and outlet openings 84 and 86 are formed in the bottom plate 24 between the outer wall 22 and baffle 26, as best seen in FIGURE 4. A standpipe 88 is mounted on the upper surface of the bottom plate 24 above the outlet opening 86, and extends upwardly therefrom to a point approximately one-half the distance between the plate 24 and the upper end of lower vessel 14. As does standpipe 70, standpipe 88 controls the level of the solution in the vessel. The openings 84 and 86 communicate with L-shaped passageways formed in blocks 90 and 92 attached to the underside of plate 24, and the passageways in turn communicate with nipples 94 and 96, which project outwardly beyond the outer wall 22 and are adapted to receive the ends of tubing or hoses (not shown).

The outlet nipples 82 and 96 in upper vessel 12 and lower vessel 14, respectively, are connected by tubing or hoses (not shown) with a buffer or electrolyte reservoir 106 beneath the upper two vessels. Referring to FIGURES 1 and 3, the upper and lower vessels, as a unit, are designed to be mounted above the reservoir 106 and are directly supported by the blocks 104 and 112 and the leg 116 which, in effect, provide a tripod support for these vessels. Thus the vessels and reservoir, when assembled, form a sturdy, compact unit.

For purposes of connection to the nipples 88 and 96 the reservoir 106 is provided with nipples 98 and 100 communicating therewith. The nipples 98 and 100 are connected to the ends of passageways 102 formed in a block 104 mounted on the top 107 of the reservoir 106 and the passageways 102 communicate with the interior of this reservoir.

The electrolyte or buffer solution is withdrawn from the reservoir 106 through a downwardly extending pipe 108, passageway 110 formed in block 112 and nipple 114.

Figure 8:
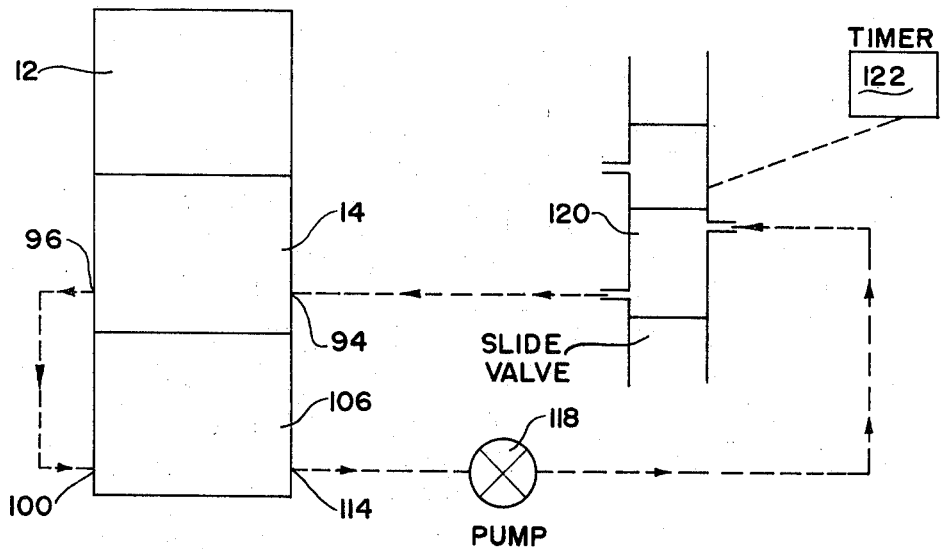
FIGURE 8 is a diagrammatic view similar to FIGURE 7 except that the outlet of the pump is shown connected to the lower buffer solution container.

Referring to FIGURES 7 and 8, the outlet nipple 114 of the reservoir 106 is connected via tubing or hoses, with the inlet of a conventional pump shown at 118. The outlet of the pump is connected, through slide valve 120 and tubing or hoses, with either the inlet nipple 80 in vessel 12 or the inlet nipple 94 in vessel 14. A conventional timer mechanism 122 controls the movement of the valve 120 and is arranged such that it periodically shifts the valve whereby the outlet of the pump is disconnected from one vessel and connected to the other. This shifting action negates the chances of the system being short circuited.

As heretofore mentioned, during the electrophoresis process, a voltage or potential difference is maintained between the upper and lower edges or ends of the gelatinous slab. A conventional electrical power source (not shown) is utilized to establish this voltage difference and the ends of the wire leads from the power source are connected to the platinum wire electrodes 124 and 126 mounted in studs 128 and 130, respectively, which project horizontally from the walls 16 and 22 of the vessels. The electrolyte or buffer solutions in the vessels 12 and 14 are in electrical contact with the power supply through the electrodes 124 and 126 which extend into the vessels and circumscribe the outer cylinder 30 and the baffle 26, respectively, thereby establishing a potential difference between the solutions in the vessels and thus between the upper and lower ends of the slab.

It is to be noted that the electrolyte or buffer solution in the lower vessel contacts the lower end of the gelatinous slab by passing between the cylinder 30 and the baffle 26, underneath the wall of the cylinder 30. Of course, slots may be formed in the baffle 26 to permit less tortuous flow if so desired.

OPERATION

The operation of the apparatus is as follows:

The inner cylinder 34 is removed from within the outer cylinder 30 and sufficient catalyzed gel solution is poured into cylinder 30 so that the gel solution is in contact with the lower end 33 of the cylinder 30. The gel is permitted to stand undisturbed for five minutes so that the gel can form and seal the lower end 33 of the cylinder 30. 200 ml. of catalyzed gel solution is then poured into cylinder 30. This gel solution is comprised of, for example 200 ml. of 5% (w./v.) solution of polyacrylamide gelling agent in which 1 ml. of beta-dimethylamino-propionitrile (DMAPN) has been added and gently mixed. Thereafter, about 0.5 gram of ammonium persulfate, C.P., is added to the solution, and the solution is mixed gently by rotation.

After the catalyzed gel solution has been poured into the cylinder 30 the coolant filled inner cylinder 34 is immediately inserted into cylinder 30 in a careful manner so as to be sure that all the gel solution is displaced and rises between the walls of the two cylinders to completely fill the annular space 36. The slot forming member 46 is then placed on the cylinder 34, taking care to avoid trapping bubbles. As noted above, not only does the member 46 form a plurality of sample slots in the top edge of the gel but it also centers the cylinder 34 with respect to cylinder 30.

After sufficient time has elapsed to insure that the gel has completely solidified or set-up, the slot forming member 46 is removed carefully to avoid tearing the gel. The vessels 12 and 14 and the buffer reservoir 106 are then filled with electrolyte or buffer solution. The circulation of the buffer solution is commenced by starting the pump 118 and purging the connecting tubing. The sample slots are then inoculated with the specimens to be analyzed by expelling the samples from a micro pipette held directly above the slots below the surface of the buffer solution. The samples, having a greater density than the buffer solution, will settle to the bottom of the sample slots. The slots formed by the slot forming member 46 are of a shape which facilitate sample inoculation and make the sample readily visible below the surface of the buffer. The action of the timer 122 periodically switches the circulation circuit to maintain uniform pH, molarity concentration and temperature. It will be appreciated that the electrolyte itself performs a cooling function in its contact with the outside of the cylinder 30. Where additional cooling is desired a cooling coil 121 may be mounted in the reservoir 106.

A hose from a water faucet and one communicating with a drain are attached to the fittings 56 and 58, respectively, in the cylinder 34 and water is slowly circulated through the cylinder for effecting additional cooling in an extremely simple manner.

While not necessary, increased mobility of the ions and improved resolution in the separation of the fractions is achieved by equilibrating the system prior to the addition of a sample. By way of example, this may be accomplished by applying a constant voltage differential of 400 volts between the upper and lower buffer solutions for one hour. After the equilibration period, the power supply is turned off and each of the sample slots is inoculated with a measured amount of sample, for example, 0.020 ml. of hemolysate. The samples are allowed to settle a few minutes before the same voltage is again applied between the upper and lower buffer solutions.

After the electrophoresis has been completed in the hemoglobin analysis, the gelatinous slab is removed from the apparatus and scanned unstained by a recording densitometer equipped with a 500 m$\mu$ interference filter. No separate staining step is required. Thereafter, the area beneath the curves from the densitometer are integrated and the present distribution of the fraction is calculated in the normal manner.

While the foregoing has been a description of the preferred embodiment of this apparatus, it should be apparent that many modifications may be made without departing from the scope of this invention. For instance, the slot former may be made such that it forms up to 30 sample slots in the top of the gelatinous slab. Likewise, more than two spacer bars may be used to divide the space 64 into a larger number of segments. Moreover, while the apparatus 10 is described primarily as being made of acrylic plastic other materials could be used.

As will be apparent from the foregoing, the novel apparatus herein described has numerous advantages. Its compact design and arrangement permit easy and efficient cooling of the gel during the separation process and permit a rate of operation that is twice that of presently commercially available apparatus. Furthermore, the apparatus of the invention can be operated with a minimum of laboratory technique which permits more reproducible results to be obtained. Another advantage of the apparatus resides in the fact that two or more gels may be used during the same separation operation. Still a further advantage resides in the fact that the buffer solutions are maintained relatively unchanged both in regard to pH and molar concentration throughout the operation.

The invention may be embodied in other specific forms without departing from the spirit or essential characteristics thereof. The present embodiment is therefore to be considered in all respects as illustrative and not restrictive, the scope of the invention being indicated by the appended

What is claimed and desired to be secured by United States Letters Patent is:

1. An apparatus for electrophoretically separating the ionic components of a sample comprising a hollow container member, a first cylinder positioned within said member and extending from the bottom thereof to adjacent the top, a second cylinder concentrically positioned within said first cylinder thereby defining an annular space for receiving a gel and the sample between the walls of said first and second cylinders; partition means extending between the inner wall of said hollow member and the outer wall of said first cylinder for dividing said member into upper and lower buffer solution containing portions, said upper portion communicating with the upper end of said space and said lower portion communicating with the lower end of said space; and electrical means for maintaining a potential difference between the ends of said space.

2. The apparatus described in claim 1 in which the second cylinder has closed side and end walls and in which a means for cooling said space includes means for circulating a coolant through said second cylinder.

3. The apparatus described in claim 1 including a reservoir; conduit means connecting said reservoir with said upper and lower portions; a pump means for circulating buffer solution between said reservoir and said upper and lower portions, and a valve means for periodically, selectively connecting the outlet of said pump to first one and then the other of said portions.

4. The apparatus described in claim 1 wherein said first cylinder forms the inner buffer containing wall of said portions whereby the buffer solution cools said annular space.

5. The apparatus described in claim 1 including an upstanding annular baffle means attached to the bottom of said hollow container member and surrounding the base of said first cylinder whereby the buffer solution in said lower portion communicates with the lower end of said annular space by passing between the inner wall of said baffle means and the outer wall of said first cylinder and under the wall of said first cylinder.

6. The apparatus described in claim 1 in which a collar member is formed on the upper end of said first cylinder; an annular slot forming means disposable on the upper end of said second cylinder for forming a plurality of spaced sample receiving slots in the upper end of the gel, said slot forming means being engageable with said first cylinder to center said second cylinder with respect to said first cylinder.

7. The apparatus described in claim 6 including a plurality of spacing members for dividing said annular space into a plurality of vertically extending segmented circular sections.

8. An apparatus for electrophoretically separating the ionic components of a sample comprising a first thin-walled cylindrical member; a second thin-wall cylindrical member positioned within the first cylindrical member thereby defining an annular space for receiving a gel between the cylindrical walls of said cylindrical members; a first container for holding buffer solution communicating with one end of said space and disposed perimetrically about at least a portion of said first member with the buffer solution in contact therewith; a second container for holding buffer solution communicating with the other end of said space and disposed perimetrically about at least another portion of said first member with the buffer solution in contact therewith and electrode means for maintaining a potential difference between the opposite ends of said space through the buffer solutions.

9. The apparatus described in claim 8 in which said first and second cylindrical members are positioned concentrically and vertically.

10. The apparatus described in claim 8 including conduit means for connecting said first and second containers with a reservoir; a pump and valve means for circulating said solution between said reservoir and selectively one and then the other of said containers.

11. The apparatus described in claim 8 in which said second cylindrical member has a closed end wall to form a container for receiving a coolant for cooling said space; and means for circulating a coolant through said second cylindrical member.

12. The apparatus described in claim 8 wherein said buffer solution is circulated in contact with one of said members to provide cooling of said space.

13. An apparatus for electrophoretically separating the ionic components in a sample comprising a first cylindrical member, a second cylindrical member positioned concentrically adjacent said first member to define an annular space for receiving a gel between said members, first container means for containing a buffer solution in communication with one end of said space, second container means for containing a buffer solution in communication with the opposite end of said space, electrical means for maintaining a potential difference between the ends of said space through said buffer solution, and means for selectively circulating the buffer solution between either said first means and a reservoir or said second means and said reservoir to prevent variations in pH and the molarity of the solutions without creating a short circuit.

14. The apparatus described in claim 13 wherein said first and second container means are disposed wholly about one of said members such that the buffer solution is circulated in contact with such one member to provide cooling for said space.

15. The apparatus described in claim 13 including a means for cooling said space between the ends thereof.

16. An apparatus for electrophoretically separating the ionic components in a sample comprising a first cylindrical member, a second cylindrical member positioned concentrically within said first member thereby defining an annular space for receiving a gel between said members, first means for containing a buffer solution communicating with one end of said space, second means for containing a buffer solution communicating with the opposite end of said space, electrical electrode means for maintaining a potential difference between the ends of said space through the buffer solution, means for selectively circulating the buffer solution between either said first means and a reservoir or said second means and said reservoir while maintaining electrical isolation between the buffer solution in said first and second containing means, said circulating means including means for connecting said first and second containing means with the reservoir, and pump means for circulating the buffer solution between said reservoir and said first and second containing means.

17. The apparatus described in claim 16 including a means for cooling said space by cooling the inner surface of said second member and the outer surface of said first member.

18. The apparatus described in claim 17 in which said second member has closed side and top walls and in which said means for cooling said space includes means for circulating a coolant within said second member.

19. The apparatus described in claim 16 including means for cooling the buffer solution in contact with the first member.

20. An apparatus for electrophoretically separating the ionic components of a sample comprising a first cylindrical member; a second cylindrical member positioned concentrically within said first cylindrical member thereby defining an annular space for receiving a gel and the sample between the members; a first container for holding a buffer solution communicating with the lower end of said space; a second container for holding a buffer solution communicating with the upper end of said space; means for cooling said space including means for circulating a coolant within said second cylindrical member; means for selectively circulating the buffer solution between either said first container and a reservoir or said second container and said reservoir and electrical means for maintaining a potential between the ends of said space.

21. An apparatus for electrophoretically separating the ionic components of a sample comprising a first cylindrical member; a second cylindrical member positioned concentrically within said first member thereby defining an annular space for receiving a gel between the walls of said members; a first means for containing a buffer solution communicating with one end of said space; a second means for containing a buffer solution communicating with the opposite end of said space, means extending between the ends of said space for dividing said space into at least two separate sections, means for cooling said space by cooling a surface of said second member, means for selectively circulating said buffer solution between either said first means and a reservoir or said second means and said reservoir thereby maintaining electrical isolation between the buffer solution in said first and second means for containing said buffer solution, and electrode means for maintaining a potential difference between the end of said space through said buffer solution.

22. An apparatus for electrophoretically separating the ionic components of a sample comprising a hollow member, a first open-ended cylinder positioned within said member and extending from the bottom thereof to adjacent the top, an annular baffle attached to the bottom of said member and surrounding the lower end of said first cylinder, a second closed end cylinder positioned concentrically within said first cylinder thereby defining an annular space for receiving a gel and the samples therebetween, a horizontal partition extending between the walls of said member and said first cylinder thereby forming upper and lower containers communicating with the upper and lower ends of said space respectively, means connecting said upper and lower containers with a reservoir, a pump means connected with said reservoir for circulating the buffer solution between said reservoir and the said containers, valve means for selectively connecting the outlet of said pump with first one and then the other of the containers, collar means mounted on said upper end of said first cylinder, means for forming a plurality of spaced, sample slots midway between the walls of said first and second concentrically positioned cylinders in the upper end of the said gel, cooling means including means communicating with the interior of said second cylinder for cooling the gel in said space, and electrical electrode means for maintaining a potential difference between the ends of the gel in said space.

References Cited

UNITED STATES PATENTS

| | | | |
|---|---|---|---|
| 3,129,158 | 4/1964 | Raymond et al. | 204—180 |
| 3,326,790 | 6/1967 | Bergrahm | 204—299 |
| 3,346,479 | 10/1967 | Natelson | 204—299 |

OTHER REFERENCES

Smithies, "An Improved Procedure for Starch-gel Electrophoresis: Further Variations in the Serum Proteins of Normal Individuals" in Journal of Biochemistry, vol. 71, No. 3, 1959, pp. 585–587.

Raymond et al., "Preparation and Properties of Acrylamide Gel for Use in Electrophoresis," Analytical Biochemistry, 1, 1960, pp. 391–396.

JOHN H. MACK, Primary Examiner

A. C. Prescott, Assistant Examiner

U.S. Cl. X.R.

204—180